July 1, 1924.
R. LONG
1,499,387
CHAIN PUMP
Original Filed July 29, 1922
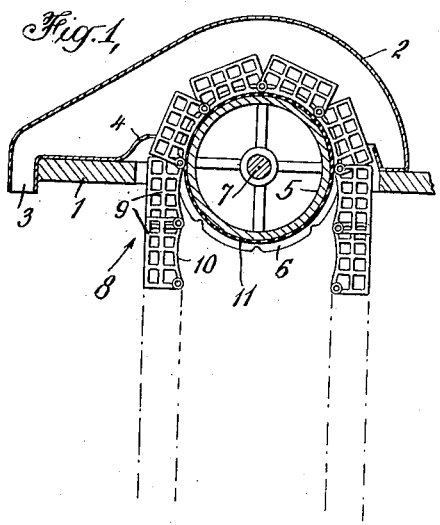
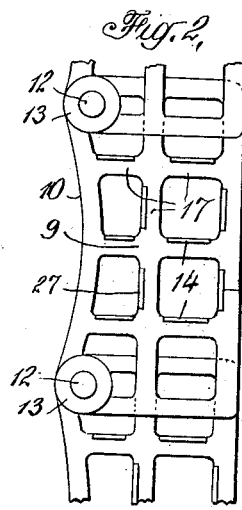
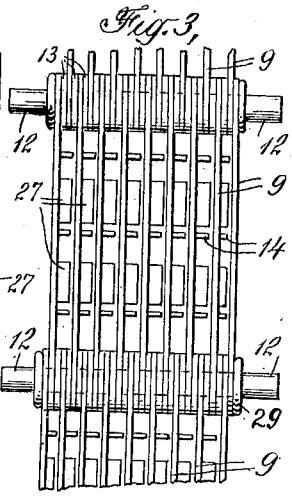
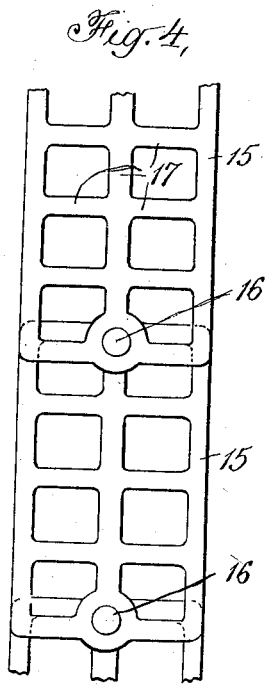
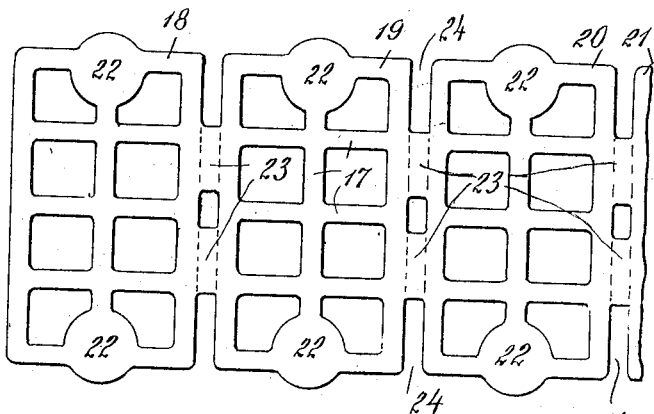
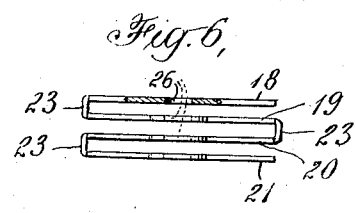
Inventor
Ramon Long
By his Attorney
Harry L. Duncan Patented July 1, 1924.

1,499,387

UNITED STATES PATENT OFFICE.

RAMON LONG, OF NEW YORK, N. Y., ASSIGNOR TO AMERICAN LIQUOLIFT CORPORATION, A CORPORATION OF DELAWARE.

CHAIN PUMP.

Application filed July 29, 1922, Serial No. 578,504. Renewed December 18, 1923.

*To all whom it may concern:*

Be it known that I, RAMON LONG, a citizen of the United States, and now residing in the city, county, and State of New York, formerly of Englewood, county of Bergen, State of New Jersey, have made a certain new and useful Invention Relating to Chain Pumps, of which the following is a specification, taken in connection with the accompanying drawing, which forms part of the same.

This invention relates especially to chain pumps in which the water carrying chain which may be vertically or otherwise arranged to pass over one or more supporting or driving wheels may be made or built up of interlocking or meshing perforated or corrugated sheet metal links which preferably have rigidly connected spacing pivot bearing portions or reinforcing bearing washers. The links may also have water carrying projections, corrugations or flanges extending transversely of the link body and comprising at least lateral projections and also, if desired, discontinuous longitudinal projections to more certainly engage and hold the water or other liquid to be handled. Such sheet metal links which are preferably arranged in planes transverse to the wheel axles over which the continuous pump chain passes, may be connected by connecting pivots so that by arranging the desired number of links side by side the chain is given the proper transverse thickness to handle the desired amount of liquid which may be carried up either with or without an enclosing tube or guiding channel. In some cases also composite or folded links may be formed of sheet metal by stamping or perforating the material and then folding or bending the same up so that several thicknesses of the sheet metal are thus connected into a composite link in which the bearing holes or portions may be stamped or otherwise accurately formed for cooperation with the connecting pivots by which the interlocking links are united.

In the accompanying drawing showing in a somewhat diagrammatic way a number of illustrative embodiments of this invention, Fig. 1 is a sectional side view of a somewhat diagrammatic arrangement of such a chain pump.

Fig. 2 shows the chain link construction on a larger scale.

Fig. 3 is a corresponding elevation taken at right angles to Fig. 2.

Fig. 4 is a side view of another form of link construction; and

Fig. 5 shows a form of sheet metal blank which may be bent up to form a composite folded link of the character shown in Fig. 6 in end section.

Sheet metal links are advantageous for chain pumps where relatively large carrying capacity is desired and the sheet metal which may be a thirty-second to a sixteenth or an eighth of an inch thick may be of such material as properly cooperates with the water or other liquid being handled and may be brass, bronze, Monel metal, wrought iron or steel which may be of special non-corrosive or non-rusting character, if desired, or protected by various galvanizing, electroplating or other coating processes in some cases. The sheet metal links which for greater lightness and liquid carrying capacity may be of perforated construction, may be stamped out or otherwise formed in any suitable way and are preferably provided with transversely extending water carrying projections, corrugations or flanges so as to increase the amount of water which may be carried by the chain through adhesion and surface tension action. As shown in Fig. 1 the continuous chain 8 of this general perforated sheet metal type may extend over an upper or driving pulley 5 operated as by the shaft 7 and having, if desired, a gripping or cushioning facing 11 of special rubber or fibre composition so as to cooperate to better advantage with the chain. If desired, sprocket flanges, such as 6, may be arranged on this driving wheel so as to cooperate with the connecting pivots or sprocket members on the chain to give positive driving action which is desirable in case of relatively high lifts, such as 30 to 60 feet or more. The upper end of the chain where the liquid is discharged by centrifugal action may be enclosed in a top casing 2 having liquid guides 4 adjacent the chain openings so that the liquid is received and guided to the discharge opening 3, this top casing and shaft, if desired, mounted on the beams or supports 1. The lower end of this chain which is indicated in dot and dash lines of course preferably extends a couple of feet below the level of the liquid to be raised and may, if desired, run over a lower wheel or idler pulley of generally similar construction which promotes the uniform action of the chain and prevents undesirable lateral vibration of the vertical runs of the pump chain which may be operated at any suitable surface speed up to five to six hundred feet or more per minute.

The chain links may as indicated in Figs. 1 and 2 be formed with lateral bearing portions and connecting pivots 12 which join the intermeshing chain links which in this type may in some cases be advantageously provided with curved inner edges 10 of such shape and radius of curvature as to properly cooperate with the driving wheels on which the chain operates, especially if no definite sprocket teeth or flanges are provided on such wheels. In this way when the radius of curvature of this inner edge is not greater than the radius of curvature of the cooperating face of the driving wheel the link can come into immediate and solid engagement with the wheel, so that longitudinal drag, slip or wear are thus minimized. The sheet metal links may be of the perforated type indicated which gives greater water carrying space or capacity with the same weight and as indicated the links may comprise the longitudinal and lateral bars or members 17 forming the cellular link body 9. The sheet metal link bodies may be formed with any suitable type of water carrying projections, flanges or corrugations to give increased grip or engagement on the water or other liquid to be handled. For this purpose a series of projecting lateral flanges or projections, such as 14 may be stamped or bent up at the same time that the perforations are stamped or formed in the link, for example, so that as indicated in Fig. 3 these lateral projections or flanges may extend substantially across from one link to the next, care being of course taken that no such projections are present at the end portions of the link where they would cause interference with the movement of the intermeshing connected links. If desired also longitudinal water carrying or retaining projections, such as 27, may be formed on various portions of the link and are preferably of a more or less discontinuous character so as not to unduly interfere with the entrance or picking up of the liquid and its discharge from the chain where it passes over the upper driving wheel, this discharge being of course facilitated by the centrifugal action and by the fact that the outer edges of the links are opened up or separated to give a freer discharge into the top casing which may be employed. Bearing portions may be stamped or otherwise formed in the links so as to accommodate the connecting pivots 12 and if desired the links may be given an increased thickness and strength at these bearing portions as by welding, soldering or otherwise connecting to the sheet metal link material at these points lateral bearing portions or washers such as 13 which may be of special wear resisting or other bearing material to give most efficient results. It is not, however, necessary in all cases that such interposed washers should be rigidly connected to any of the links since where the wear of the sheet metal links is not such an important consideration any loose spacing washers may be interposed between the links so as to give them the proper transverse spacing apart as indicated in Fig. 3 and of course when the desired number of links have been arranged side by side in intermeshed position on the connecting pivots they may be retained in place by the use of any suitable holding device such as the holding washers 29 which may be forced and held on the connecting pivots by any effective means. In this way the pump chain may be given a lateral dimension of as much as two or three inches or more and any desired transverse thickness and the links may have a length of two to six inches more or less, depending on the particular conditions of service.

Fig. 4 shows a form of sheet metal link chain in which the bearing portions and cooperating pivots 16 may be arranged substantially centrally of each of the links 15 which may have similar longitudinal and lateral bars or members 17 to give a light weight cellular type of construction. Fig. 5 illustrates a way in which a composite folded link may be constructed, the link sections 18, 19, 20 and 21 being stamped out of any suitable sheet metal and formed with perforations to produce the longitudinal and lateral bars or members 17 and also the bearing portions 22 at any suitable part of the link sections adjacent their ends. The connector portions 23 are preferably of a discontinuous character and after stamping out the composite link blank these connector portions may be folded or bent so that the link sections are brought into substantially parallel position as indicated in Fig. 6. Thus two, four or any other desired number of spaced link sections may be formed which are held in spaced relation to a greater or less extent by the connector portions. For some purposes it is desirable to form the bearing holes or pivot apertures in such composite links after they have been folded into substantially final form and for this purpose the pivot apertures 26 may be bored or otherwise formed in the bent up links shown in Fig. 6 preferably in connection with suitable spacer members which may be slipped between the link sections during the operation. Such composite folded links may of course be intermeshed with others in connection, if desired, with suitable interposed spacing washers so that the adjacent link elements are brought into proper cooperation and of course any of these forms of sheet metal link may be produced with such water carrying projections, corrugations or flanges of the types previously described.

This invention has been described in connection with a number of illustrative embodiments, forms, proportions, materials, parts, elements, arrangements and devices, to the details of which disclosure the invention is not of course to be limited, since what is claimed as new and what is desired to be secured by Letters Patent is set forth in the appended claims.

Having now described my invention what I claim is:

1. The chain pump comprising a wheel and a continuous liquid carrying chain formed of intermeshing perforated sheet metal links having rigidly connected bearing portions spacing the adjacent links apart transversely of the chain and cooperating connecting pivots, said links having transversely projecting water carrying flanges adjacent the perforations in said links and extending in a lateral and longitudinal direction to promote the liquid carrying capacity of the links.

2. The chain pump comprising a wheel and a continuous liquid carrying chain formed of intermeshing perforated sheet metal links and cooperating connecting pivots, said links having transversely projecting water carrying flanges extending in a lateral direction to promote the liquid carrying capacity of the links.

3. The chain pump comprising a wheel and a continuous liquid carrying chain formed of intermeshing folded multiple sheet metal links, means spacing the adjacent links apart transversely of the chain and cooperating connecting pivots, said links having perforated and transversely projecting water carrying projections to promote the liquid carrying capacity of the links.

4. The liquid carrying chain formed of intermeshing folded multiple sheet metal links, cooperating connecting devices, said links having transversely projecting water carrying projections to promote the liquid carrying capacity of the links.

5. The pump chain comprising intermeshing sheet metal links arranged side by side and cooperating connecting pivots, said links being formed with rigidly connected reinforced bearing portions, said links being provided with integral transversely extending lateral and longitudinal water carrying projections extending from one side of each link toward the adjacent links in the assembled chain.

6. The pump chain comprising intermeshing sheet metal links arranged side by side and cooperating connecting devices, said links being formed with bearing portions, said links being provided with transversely extending lateral water carrying projections extending from one side of each link toward the adjacent links in the assembled chain.

7. The pump chain comprising intermeshing perforated sheet metal links arranged side by side and cooperating pivots, said links being formed with laterally located, rigidly connected bearing washers adjacent one edge of the link and the inner link edge adjacent said bearing portions being given a curved contour adapted to give end engagement in connection with the driving or supporting wheels on which the chain is used, said links having a perforated cellular form provided with integral transversely extending lateral and longitudinal water carrying projections extending from one side of each link close to the adjacent links in the assembled chain.

8. The pump chain comprising intermeshing perforated sheet metal links arranged side by side and cooperating pivots, said links being formed with laterally located, rigidly connected bearing washers adjacent one edge of the link, said links having a perforated cellular form provided with integral transversely extending lateral water carrying projections extending from one side of each link towards the adjacent links in the assembled chain.

9. The pump chain comprising intermeshing perforated sheet metal links arranged side by side and cooperating connecting pivots, said links being formed with rigidly connected bearing washers adjacent one edge of the link, said links having a perforted cellular form provided with integral transversely extending water carrying projections extending toward the adjacent links in the assembled chain.

In testimony whereof I have signed my name to this specification.

RAMON LONG.